US008640829B2

(12) United States Patent
Block, Jr. et al.

(10) Patent No.: US 8,640,829 B2
(45) Date of Patent: Feb. 4, 2014

(54) HYDRAULIC ELEVATOR SYSTEM

(76) Inventors: William P. Block, Jr., Clear Spring, MD (US); William P. Block, Sr., Falling Waters, WV (US); John M. Phillips, II, Martinsburg, WV (US)

( * ) Notice: Subject to any disclaimer, the term of this patent is extended or adjusted under 35 U.S.C. 154(b) by 860 days.

(21) Appl. No.: 12/458,586

(22) Filed: Jul. 16, 2009

(65) Prior Publication Data

US 2010/0012436 A1 Jan. 21, 2010

Related U.S. Application Data

(60) Provisional application No. 61/129,743, filed on Jul. 16, 2008.

(51) Int. Cl.

*B66B 9/04* (2006.01)
*F15B 15/14* (2006.01)
*B66B 19/04* (2006.01)
*B23P 11/00* (2006.01)

(52) U.S. Cl.

USPC .......... 187/272; 187/275; 187/414; 254/93 R; 29/525.01

(58) Field of Classification Search

USPC ............ 187/272, 274, 275, 900; 29/428, 429, 29/525.01; 60/477; 254/2 B, 2 C, 93 L, 93 R
IPC ..... B66B 9/04; F16D 31/00,31/02; F16B 15/14
See application file for complete search history.

(56) References Cited

U.S. PATENT DOCUMENTS

| | | | | | |
|---|---|---|---|---|---|
| 94,678 | A | * | 9/1869 | Julien | 83/746 |
| 946,781 | A | * | 1/1910 | Julien | 187/275 |
| 1,784,554 | A | * | 12/1930 | Stukenborg | 254/93 L |
| 2,809,494 | A | * | 10/1957 | Matson et al. | 60/458 |
| 4,316,316 | A | * | 2/1982 | Kappenhagen | 29/426.1 |
| 4,379,389 | A | * | 4/1983 | Liesener | 60/428 |
| 5,217,091 | A | | 6/1993 | Shiina et al. | |
| 5,451,134 | A | * | 9/1995 | Bryfogle | 414/680 |
| 5,636,713 | A | * | 6/1997 | Perkins et al. | 187/274 |
| 6,247,559 | B1 | | 6/2001 | Ach | |
| 6,357,556 | B1 | * | 3/2002 | Pettersson et al. | 187/414 |
| 6,379,073 | B1 | * | 4/2002 | Yoo et al. | 403/90 |
| 6,422,349 | B1 | * | 7/2002 | Veletovac | 187/272 |
| 6,499,567 | B2 | * | 12/2002 | Foschini et al. | 187/272 |
| 6,719,099 | B2 | | 4/2004 | Lamb et al. | |

(Continued)

FOREIGN PATENT DOCUMENTS

| | | | | | |
|---|---|---|---|---|---|
| EP | 1083141 | A2 | * | 3/2001 | B66B 9/04 |
| GB | 2267888 | A | * | 12/1993 | B66B 9/04 |

(Continued)

*Primary Examiner* — Michael Mansen
*Assistant Examiner* — Stefan Kruer
(74) *Attorney, Agent, or Firm* — Richard C. Litman

(57) ABSTRACT

The hydraulic elevator system has several configurations, each incorporating the hydraulic motor and pump at the lower end of the hydraulic ram and cylinder assembly. A first embodiment utilizes a wet pump and motor assembly at the lower end of the cylinder, with the volume between the cylinder and casing providing a hydraulic reservoir. A second embodiment provides a dry pump and motor installed at the lower end of the cylinder below the surrounding casing and hydraulic reservoir. A third embodiment attaches the pump and motor to the lower end of the hydraulic ram, with the pump and motor traveling up and down with the ram during operation. Further systems facilitating the installation and removal of the hydraulic cylinder and attached components for maintenance are also provided.

14 Claims, 13 Drawing Sheets

(56) References Cited

U.S. PATENT DOCUMENTS

| | | | | |
|---|---|---|---|---|
| 6,857,493 | B2 * | 2/2005 | Shupp et al. | 180/168 |
| 2005/0150728 | A1 * | 7/2005 | Van Der Meijden et al. | 187/411 |
| 2005/0224301 | A1 | 10/2005 | Aulanko et al. | |
| 2005/0275161 | A1 * | 12/2005 | Fischer | 271/277 |
| 2006/0231345 | A1 | 10/2006 | Mustalahti et al. | |
| 2006/0243531 | A1 | 11/2006 | Bjorni et al. | |
| 2007/0181381 | A1 * | 8/2007 | Jungbauer et al. | 187/401 |
| 2008/0289327 | A1 * | 11/2008 | Mintgen et al. | 60/477 |

FOREIGN PATENT DOCUMENTS

| | | | | |
|---|---|---|---|---|
| JP | 53023464 | A * | 3/1978 | B66B 9/04 |
| JP | 54038049 | A * | 3/1979 | B66B 9/04 |
| JP | 3-158372 | | 7/1991 | |
| JP | 4-169491 | | 6/1992 | |
| JP | 05024773 | A * | 2/1993 | B66B 9/04 |
| JP | 06191765 | A * | 7/1994 | B66B 9/04 |
| JP | 09208159 | A * | 8/1997 | B66B 9/04 |
| WO | WO 2007009269 | A1 * | 1/2007 | B66B 9/04 |

* cited by examiner

HYDRAULIC ELEVATOR SYSTEM

CROSS-REFERENCE TO RELATED APPLICATION

This application claims the benefit of U.S. Provisional Patent Application Ser. No. 61/129,743, filed Jul. 16, 2008.

BACKGROUND OF THE INVENTION

1. Field of the Invention

The present invention relates generally to hydraulic mechanisms. More specifically, the present invention comprises various embodiments of a hydraulic elevator system in which the hydraulic pump and motor are installed at the bottom of the well hole and hydraulic actuator installed therein. The present system includes structure and means to facilitate installation and maintenance of the assembly as well.

2. Description of the Related Art

Elevators generally rely upon one of two principles of operation. Electrically powered traction elevators use cables or wire ropes in their operation, and are installed in relatively taller buildings and structures. Hydraulic elevators use one or more hydraulic cylinder jack and ram assemblies to lift and lower the elevator car. Due to the limitations of strut extension, hydraulic elevators are generally limited to buildings and structures of no more than about six floors in height.

Accordingly, a hydraulic elevator will require a well hole below the elevator hoistway, with the well hole extending downwardly a distance at least slightly greater than the extension length of the hydraulic ram. As a result, most of the hydraulic mechanism is installed in a machine room to one side of the elevator hoistway, or perhaps in a remote location elsewhere in the building, for accessibility during maintenance and repair. This is true for both "dry" systems where the motor and pump are external to the hydraulic tank, and "wet" systems where the motor and pump are installed within the hydraulic tank. Each system has its advantages and disadvantages, but both require a separate machine room, resulting in additional noise, vibration, heat generation into the building, and at least on some occasions, the transmission of various odors into the building.

As a result, a relatively new principle of operation has been developed in Europe and which is now being installed at some locations in the U.S. This is a "machine-roomless" configuration, comprising a traction elevator having the power system installed in the hoistway. However, this system requires a relatively complex hoist cable run, along with two separate sets of guide rails for the elevator car and for the counterweights. System longevity has not been good with such elevators, due to relatively frequent need for cable replacement due to the multiple pulleys and sheaves typically installed in such systems. When cable replacement is required, the job is generally quite cumbersome and time consuming due to the relative complexity of the installation.

Thus, a hydraulic elevator system solving the aforementioned problems is desired.

SUMMARY OF THE INVENTION

The hydraulic elevator system has various configurations, each of which places the hydraulic pump and its drive motor at the bottom of the jack or ram of the hydraulic cylinder assembly. A first embodiment comprises a "wet" system, in which the motor and pump are submerged in hydraulic fluid at the bottom of the casing enclosing the hydraulic cylinder assembly therein. A second embodiment utilizes a "dry" pump and motor assembly, with the pump and motor being installed at the bottom of the cylinder assembly beneath its surrounding casing and hydraulic reservoir. A third embodiment comprises another "wet" system, wherein the motor and pump are affixed to the bottom of the lift ram and travel up and down within the surrounding cylinder with the ram when the elevator is operated. In each embodiment, the need for a separate machine room is eliminated, thereby reducing noise, vibration, potential odors, and other problems associated with elevators having separate machine rooms. Safety is also improved, as need is eliminated for a relatively large, high pressure hydraulic line between the hydraulic equipment in the machine room and the hydraulic lift cylinder assembly, thus also obviating the potential for leaks and/or breakage of such a hydraulic transfer line.

The hydraulic elevator system also includes mechanisms to facilitate the installation and maintenance of the embodiments briefly described above. Rather than rigidly and immovably affixing the hydraulic cylinder in the floor of the elevator pit, the present system utilizes an articulated joint (gimbal or spherical joint) at the upper end of the cylinder to allow the cylinder to be self-plumbing during installation rather than requiring tedious and time-consuming alignment by mechanics. The hydraulic pump and motor of any of the system embodiments may be accessed by lifting the hydraulic cylinder assembly and its motor and pump from the casing installed within the well hole. This is accomplished by detaching the cylinder from its mounting in the floor of the elevator pit and raising the elevator with the attached cylinder, using a separate lift winch and cable temporarily attached to the top of the elevator sling. The motor and pump, and any other components normally situated at the bottom of the casing, are easily accessed when the elevator is raised nearly to the top of its hoistway with the attached hydraulic assembly extending immediately below the elevator car and sling. This process can be completed quickly and easily any number of times throughout the service life of the elevator, due to the gimbal system noted further above.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises several embodiments of a hydraulic elevator system, each of which places the hydraulic pump and motor assembly at the bottom or lower end of the hydraulic cylinder and/or hydraulic ram. An apparatus and system to facilitate access of the pump and motor for maintenance, and to install or reinstall the hydraulic assembly, is also provided.

Figure 1A:
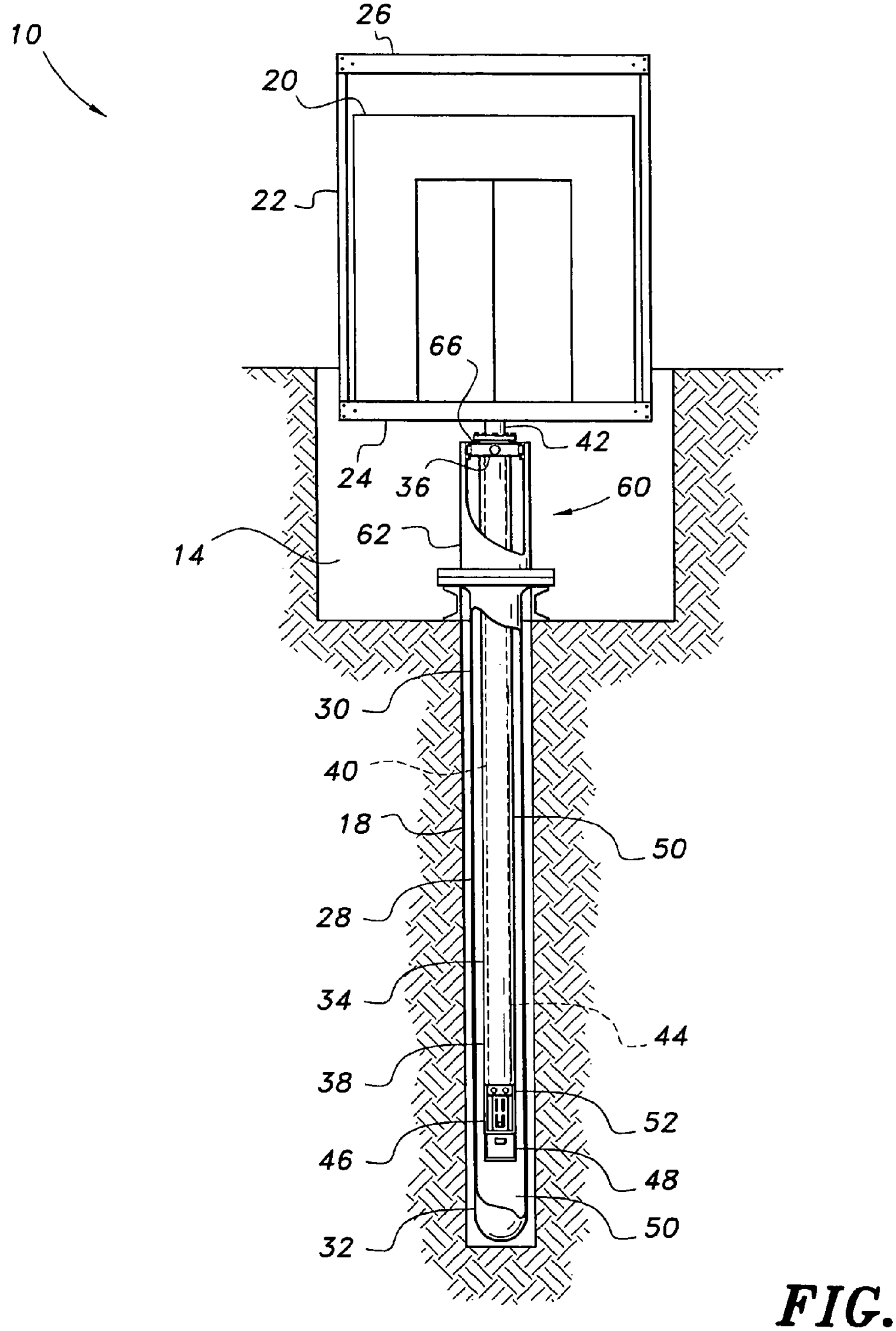
FIG. 1A is a schematic elevation view of a first embodiment of a hydraulic elevator system according to the present invention, incorporating a wet pump and motor installation at the bottom of the hydraulic cylinder.
Figure 1B:
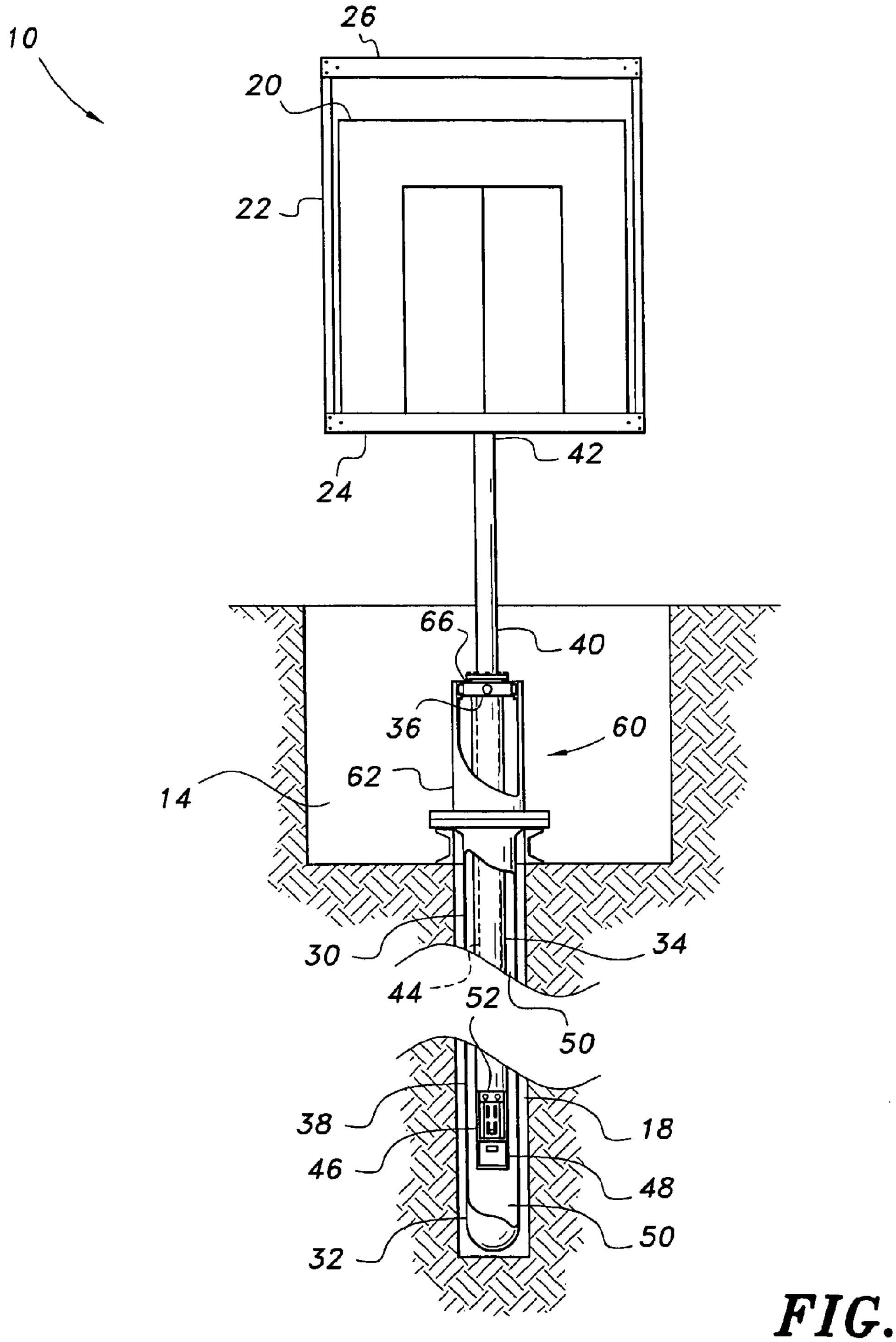
FIG. 1B is a schematic elevation view of the embodiment of FIG. 1A, showing the elevator lifted from the view of FIG. 1A.

FIGS. 1A and 1B of the drawings provide schematic illustrations of a first embodiment 10 of the hydraulic elevator assembly having a "wet" pump and motor assembly submerged in a hydraulic fluid reservoir at the bottom of the hydraulic cylinder. The system 10 includes an elevator hoistway 12 (shown in FIGS. 6A and 6B) having an elevator pit 14 at its lower end and an opposite upper end 16. The elevator pit 14 has a well hole 18 extending downwardly therefrom, to accommodate the hydraulic assembly of the elevator system.

An elevator car 20 is suspended in the hoistway 12 by an elevator sling 22, with the sling providing a support structure for the elevator car. The sling 22 includes a lower crossmember 24, known in the trade as a bolster channel, extending beneath the elevator car, and an upper crossmember 26, known as a crosshead, above the elevator car. The bolster channel and crosshead 24 and 26 of the elevator sling 22 respectively provide for attachment of the hydraulic assembly to the elevator car 20, and for attachment of other components for lifting the car 20 for maintenance and repair of the elevator system.

A casing 28 (shown in partial section in FIGS. 1A and 1B) extends downwardly through the well hole 18, with the casing having an upper end 30 at the floor of the elevator pit 14 and an opposite lower end 32 adjacent the bottom or lower end of the well hole. The casing 28 is immovably and permanently installed in the well hole 18 in most embodiments, but may serve as the outer wall of the hydraulic cylinder and may be configured for removal from the well hole for maintenance in at least one embodiment. The casing 28 acts as a protective barrier for the hydraulic assembly contained therein, and preferably includes an external anti-corrosive coating or shell (e.g., a plastic coating or sleeve, etc.).

A hydraulic cylinder 34 is installed concentrically within the casing 28, with the upper end 36 being secured to the attachment structure at the floor of the elevator pit 14 and the opposite lower end 38 suspended freely within the casing 28. Alternatively, the cylinder may serve as the casing within the well hole, as in the third embodiment of FIGS. 3A and 3B discussed further below. Preferably, the upper end attachment of the hydraulic cylinder 34 to its attachment structure is by means of an articulated joint (gimbal or spherical joint), illustrated in detail in FIGS. 4A, 4B, and 5 and discussed further below. A hydraulic ram or piston 40 reciprocates within the cylinder 34, with the upper end 42 of the ram being affixed to the bolster channel or lower crossmember 24 of the elevator sling 22 and its opposite lower end 44 disposed within the cylinder 34.

In the embodiment of FIGS. 1A and 1B, the hydraulic assembly comprising the hydraulic pump 46 and its electric drive motor 48 are installed at the lower end 38 of the hydraulic cylinder 34, and are submerged in the hydraulic fluid reservoir 50 defined by the inner wall of the casing 28 and the outer surface of the cylinder 34. The pump and motor 46 and 48 may be concentric with the cylinder 34, or may be offset and laterally adjacent to one another, depending upon the specific pump and motor configuration. Conventional electrical power and control wiring or cables (not shown) extend down between the inner wall of the casing 28 and the cylinder 34, to the motor 48 and its electrically controlled valve assembly 52 to provide electrical power to the motor 48 and to control the valve assembly 52.

In FIG. 1A, the elevator 20 is at rest at its lowest point of travel. When the system is actuated, electrical power is provided to the motor 48 and control valve mechanism 52. The motor 48 drives the pump 46 to draw hydraulic fluid from the surrounding reservoir 50 to pressurize the system, with the valve opening to allow pressurized fluid to flow from the pump 46 into the hydraulic cylinder 34. This forces fluid into the volume within the lower end of the cylinder 34 beneath the lower end 44 of the ram 40, thereby pushing the ram upwardly to raise the sling 22 and its elevator car 20, generally as shown in FIG. 1B. When the elevator 20 is to be lowered, the valve 52 is opened to allow hydraulic fluid to flow from the pressurized interior of the cylinder 34 to the reservoir 50 between the cylinder and casing 28, with the weight of the elevator car 20, sling 22, and ram 40 pushing the fluid from the cylinder 34 into the reservoir 50.

Figure 2A:
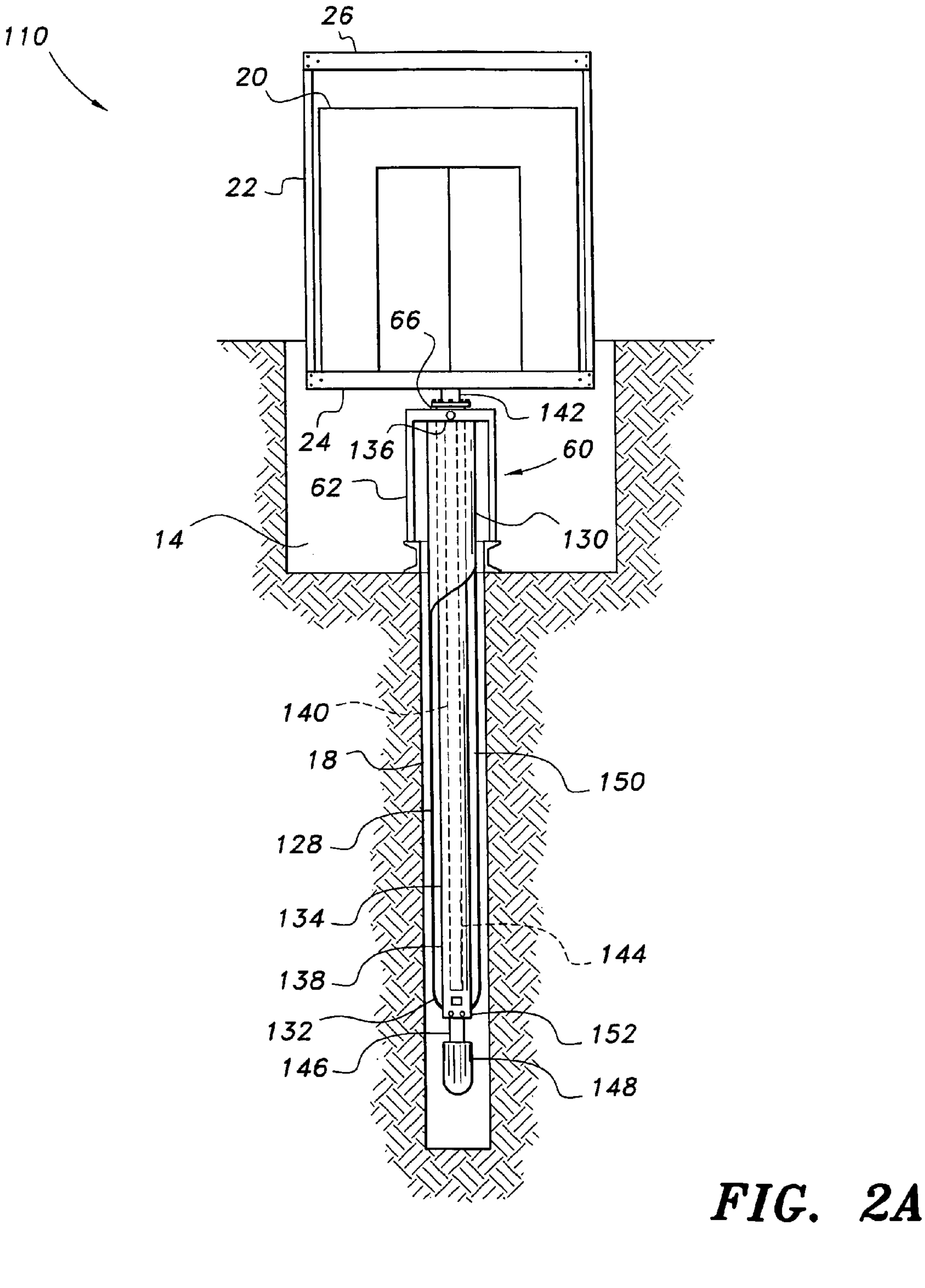
FIG. 2A is a schematic elevation view of a second embodiment hydraulic elevator system according to the present invention, incorporating a dry pump and motor installation at the bottom of the hydraulic cylinder.
Figure 2B:
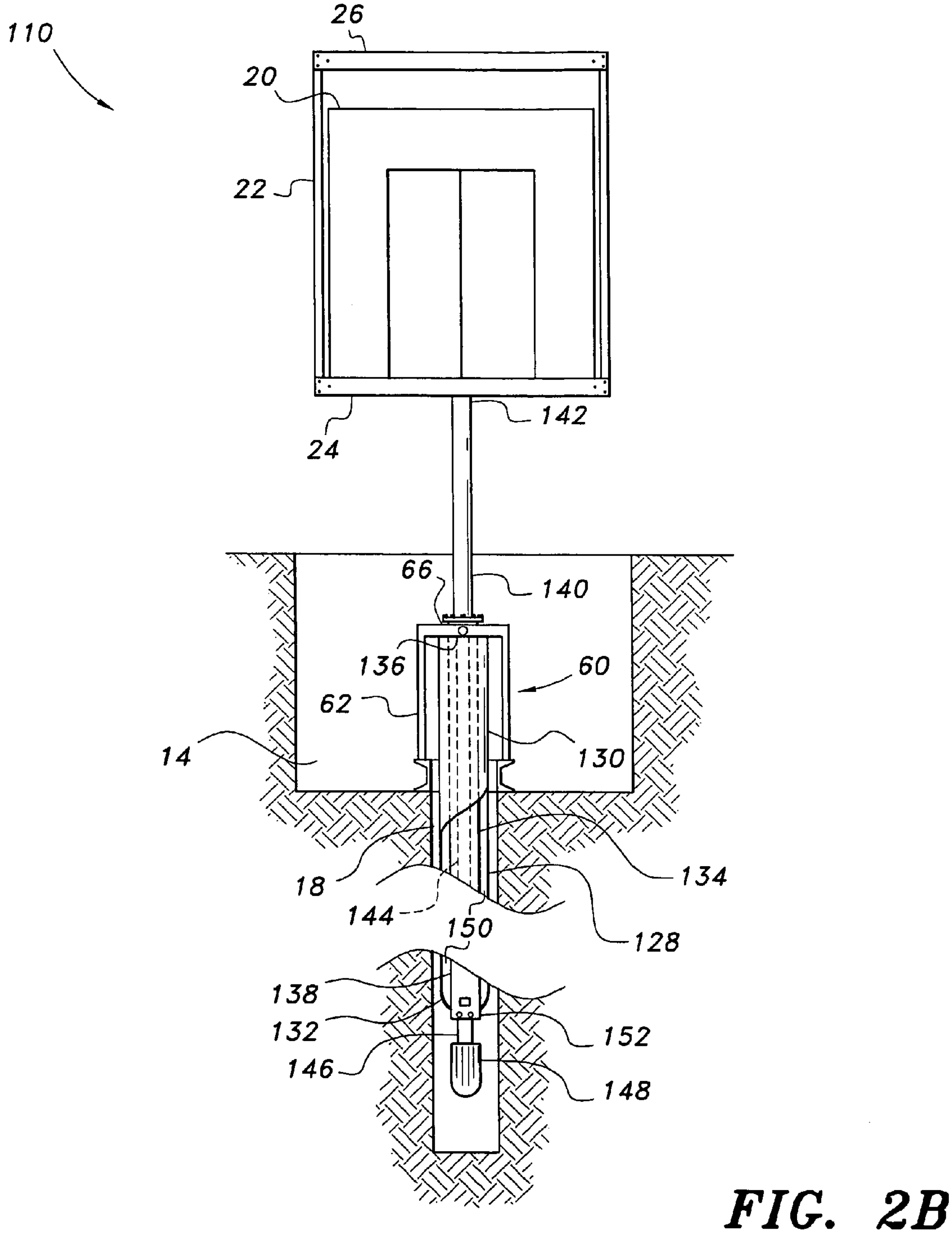
FIG. 2B is a schematic elevation view of the embodiment of FIG. 2A, showing the elevator lifted from the view of FIG. 2A.

FIGS. 2A and 2B illustrate another embodiment of the present hydraulic elevator system. The second embodiment 110 of FIGS. 2A and 2B is quite similar to the first embodiment 10 of FIGS. 1A and 1B, differing primarily in that the motor and pump assembly of the second embodiment is a "dry" unit, i.e., it is not submerged in the hydraulic fluid reservoir. The elevator system 110 of FIGS. 2A and 2B includes an elevator hoistway 12 (shown in FIGS. 6A and 6B) having an elevator pit 14 at its lower end and an opposite upper end 16. The elevator pit 14 has a well hole 18 extending downwardly therefrom, to accommodate the hydraulic assembly of the elevator system. The elevator car 20 and the sling 22 with its bolster channel and crosshead 24 and 26 are essentially identical to the like numbered components of the embodiment 10 of FIGS. 1A and 1B.

The casing 128 of the elevator system 110 is shown in partial section in FIGS. 2A and 2B, and extends downwardly through the well hole 18 from its upper end 130 at the floor of the elevator pit 14. However, the opposite lower end 132 terminates above the pump and motor assembly, and is sealed about the lower end of the concentrically contained hydraulic cylinder therein. As in the case of the casing 28 of the first embodiment, the casing 118 preferably includes an external anti-corrosive coating or shell (e.g., a plastic coating or sleeve, etc.).

A hydraulic cylinder 134 is installed concentrically within the casing 128, with the upper end 136 being secured to the attachment structure at the floor of the elevator pit 14 and the opposite lower end 138 sealed within the surrounding lower end 132 of the casing 118 that is in turn freely suspended within the bottom of the well hole 18. Preferably, the upper end attachment of the hydraulic cylinder 134 to its attachment structure is by means of a gimbal or spherical joint, illustrated in detail in FIGS. 4A, 4B, and 5 and discussed further below. A hydraulic ram 140 reciprocates within the cylinder 134, with the upper end 142 of the ram being affixed to the bolster channel 24 of the elevator sling 22 and its opposite lower end 144 disposed within the cylinder 134.

In the embodiment of FIGS. 2A and 2B, the hydraulic assembly comprising the hydraulic pump 146 and its electric drive motor 148 are installed at the lower end 138 of the hydraulic cylinder 134, as in the case of the first embodiment 10 of FIGS. 1A and 1B. However, the pump and motor assembly 146, 148 of FIGS. 2A and 2B are "dry" units, in that they are not submerged in the hydraulic fluid reservoir. In the embodiment of FIGS. 2A and 2B, the reservoir 150 is defined by the inner wall of the casing 128 and the outer surface of the cylinder 134, but terminates at the lower end 138 of the cylinder above the pump 146, motor 148, and controller assembly 152. Control of the pump, motor, and control valve assembly is as described further above for the embodiment 10 of FIGS. 1A and 1B.

Figure 3A:
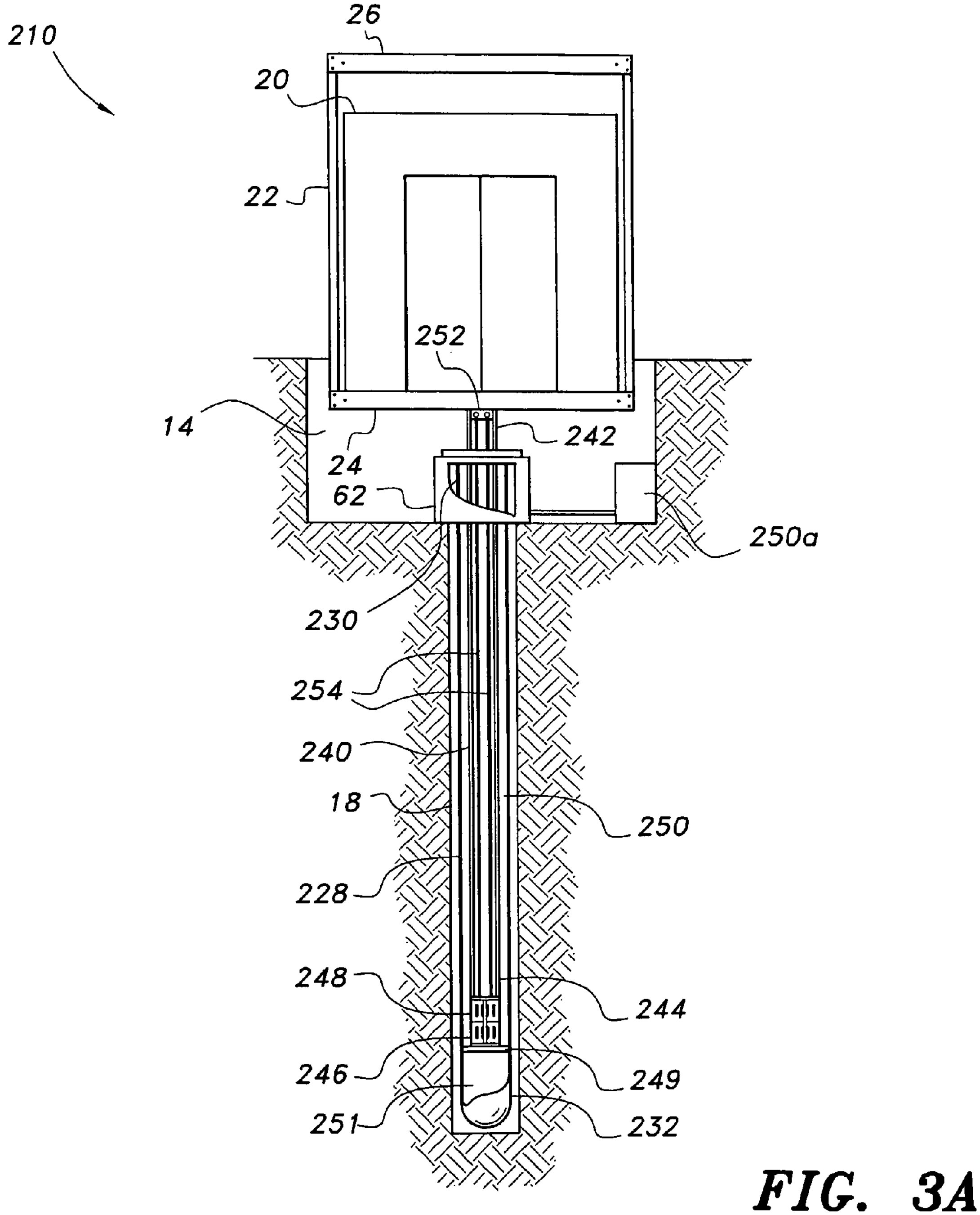
FIG. 3A is a schematic elevation view of a third embodiment hydraulic elevator system according to the present invention, incorporating a wet pump and motor affixed to the lower end of the hydraulic ram within the cylinder and traveling with the ram during elevator operation.
Figure 3B:
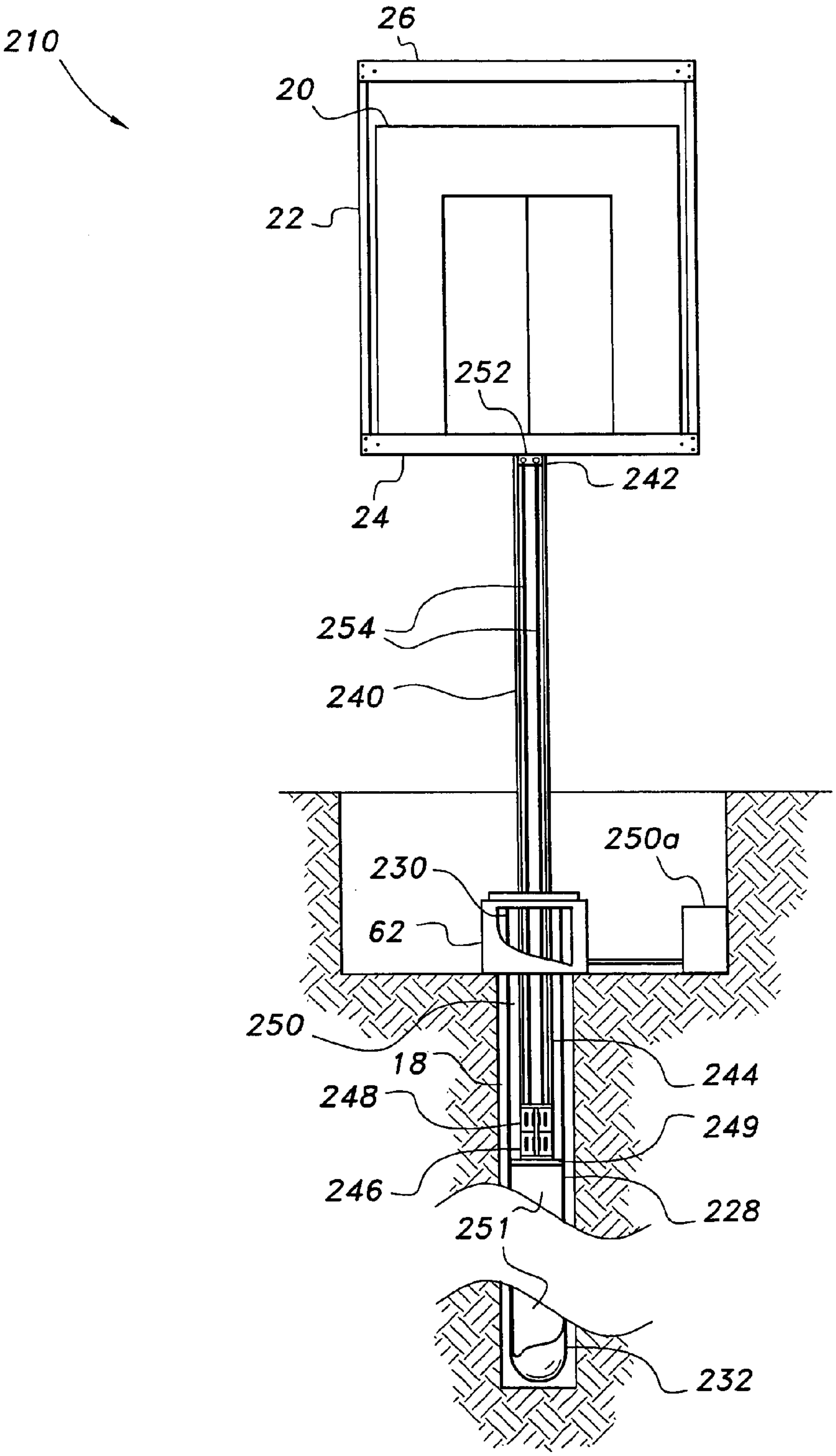
FIG. 3B is a schematic elevation view of the embodiment of FIG. 3A, showing the elevator lifted from the view of FIG. 3A.

FIGS. 3A and 3B illustrate a third embodiment of the present hydraulic elevator system. The third embodiment 210 of FIGS. 3A and 3B is quite similar to the first and second embodiments 10 and 110 respectively of FIGS. 1A, 1B and 2A, 2B, differing primarily in that the motor and pump assembly of the third embodiment is affixed to the lower end of the vertically reciprocating hydraulic piston or ram, rather than to the lower end of the relatively stationary hydraulic cylinder.

The elevator system 210 of FIGS. 3A and 3B includes an elevator hoistway 12 (shown in FIGS. 6A and 6B) having an elevator pit 14 at its lower end and an opposite upper end 16. The elevator pit 14 has a well hole 18 extending downwardly therefrom, to accommodate the hydraulic assembly of the elevator system. The elevator car 20 and the sling 22 with its bolster channel and crosshead 24 and 26 are essentially identical to the like numbered components of the embodiments 10 and 110 of FIGS. 1A through 2B.

The casing 228 of the elevator system 210 is shown in section in FIGS. 3A and 3B, and extends downwardly through the well hole 18 from its upper end 230 at or slightly above the floor of the elevator pit 14. The opposite lower end 232 extends downwardly to a point essentially at the bottom of the well hole 18. As in the case of the casings 28 and 128 of the first and second embodiments, the casing 228 preferably includes an external anti-corrosive coating or shell (e.g., a plastic coating or sleeve, etc.). The third embodiment of FIGS. 3A and 3B differs from the first two embodiments in that the casing 228 also serves as the hydraulic cylinder and is freely suspended within the well hole 18, although it will be seen that the mechanism of the third embodiment may incorporate a separate hydraulic cylinder with the pump and motor assembly traveling within the cylinder with the lower end of the hydraulic ram, if so desired.

Preferably, the upper end attachment of the casing and cylinder combination 228 to its attachment structure is by means of a gimbal (FIGS. 4A and 4B) or spherical joint (FIG. 5), discussed further below. A hydraulic piston or ram 240, shown in section in FIGS. 3A and 3B, reciprocates within the casing and cylinder 228, with the upper end 242 of the ram being affixed to the bolster channel 24 of the elevator sling 22 and its opposite lower end 244 disposed within the casing and cylinder 228.

In the embodiment of FIGS. 3A and 3B, the hydraulic assembly comprising the hydraulic pump 246 and its electric drive motor 248 are installed concentrically upon the lower end 244 of the movable hydraulic ram 240, rather than upon the stationary end of the hydraulic cylinder. A seal 249 is installed at the lower end of the pump and motor assembly, with the seal, inner wall of the casing and cylinder 228, and outer surface of the hydraulic ram 240 defining a hydraulic reservoir 250. The seal 249 separates this hydraulic reservoir 250 from the working chamber volume 251 in the lower end of the casing and cylinder 228, blocking the flow of hydraulic fluid therebetween except through the pump 246 and its orifices. It will be seen that as the pump and motor assembly 246, 248 are installed above the seal 249, they are "wet" type mechanisms as they are located within the lower end of the hydraulic fluid reservoir 250. Control of the pump, motor, and control valve assembly is as described further above for the embodiment 10 of FIGS. 1A and 1B.

In FIG. 3A, the elevator 20 is at rest at its lowest point of travel. When the system is actuated, electrical power is provided to the motor 248 from the control mechanism 252, located at the upper end 242 of the hydraulic ram to facilitate access thereto for adjustment and maintenance. Electrical lines or cables 254 extend from the controller 252 downward through the interior of the hydraulic ram 240 to the pump drive motor 248, with appropriate conventional circuitry also provided to operate the pump valves as required.

The motor 248 drives the pump 246 to draw hydraulic fluid from the surrounding reservoir 250 to pressurize the system, with appropriate valving opening to allow pressurized fluid to flow from the pump 246 into the working chamber 251 in the bottom of the casing and cylinder 228. This pressurized fluid in the working chamber 251 of the casing and cylinder 228 pushes the seal 249, its attached pump and motor 246 and 248, and the ram 240 to which they are attached, upwardly to raise the sling 22 and its elevator car 20 generally as shown in FIG. 3B. A supplementary hydraulic fluid reservoir 250*a* may be provided in the elevator pit 14 or elsewhere as desired, to provide sufficient fluid to replace the fluid from the reservoir 250 as it is transferred to the working chamber during upward elevator operation.

When the elevator 20 is to be lowered, an electrical signal is sent from the controller 252 to the pump 246 to open the appropriate valving to allow hydraulic fluid to flow from the pressurized working chamber 251 of the casing and cylinder 228 back into the reservoir 250 between the cylinder and casing 228 and its concentrically contained hydraulic ram 240, with the weight of the elevator car 20, sling 22, and ram 240 pushing the fluid from the working volume 251 into the reservoir 250.

It will be seen that as the hydraulic pump and its drive motor, and in some cases the controller as well, are located at the bottom of the hydraulic assembly (or at least at the lower end of the hydraulic ram), that some means must be provided to facilitate the removal and reinstallation of the hydraulic assembly. One of the most difficult and time-consuming operations in the reinstallation of the hydraulic mechanism of an elevator is the accurate alignment (plumbing) of the mechanism within the well hole. However, such accuracy is essential to assure that no bending loads are imposed upon the hydraulic ram as it extends to raise the elevator. An inaccurate installation would result in binding of the ram in its cylinder, seal damage, and an inoperable and/or short-lived elevator.

Figure 4A:
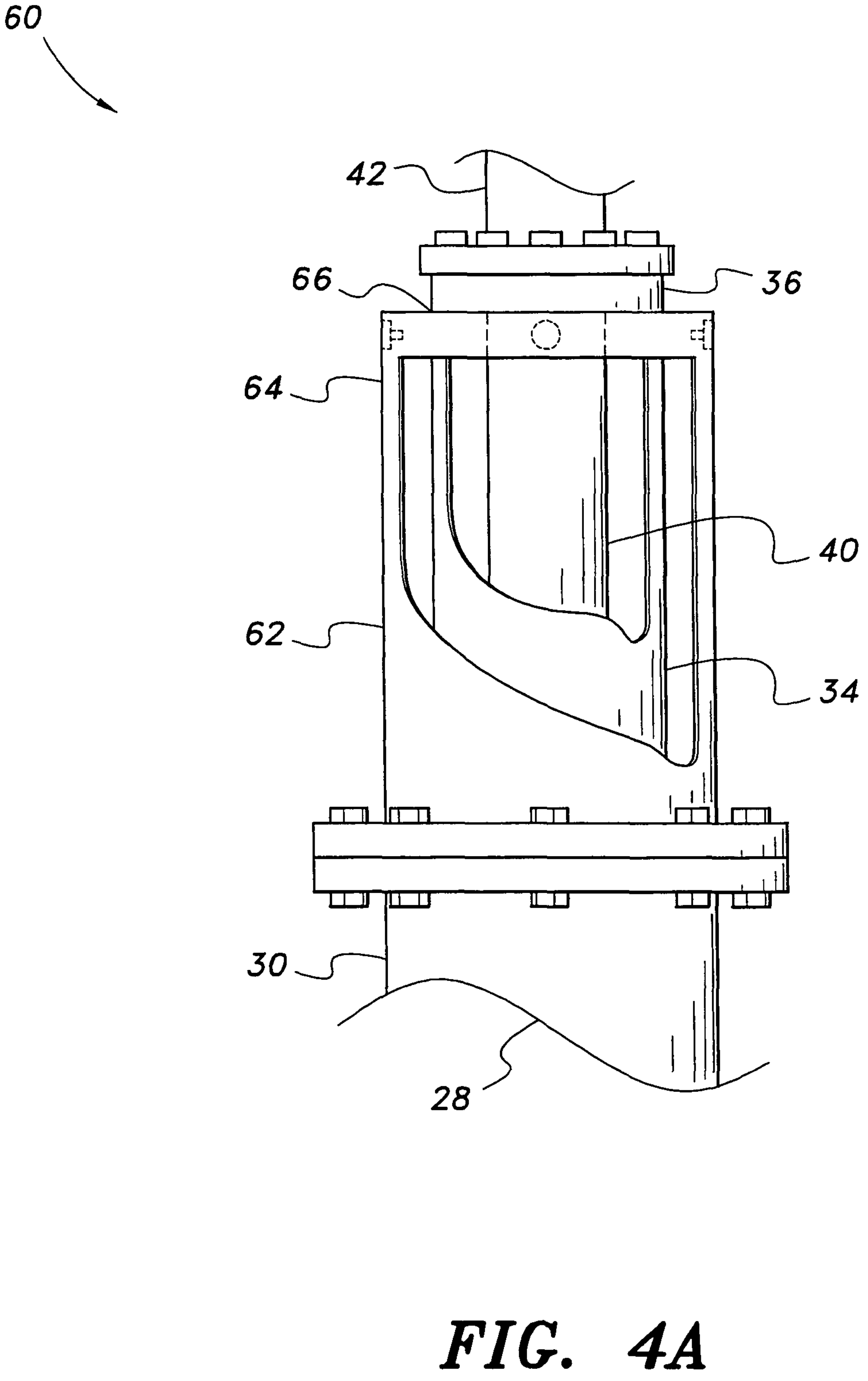
FIG. 4A is a detailed elevation view in partial section of the gimbaled upper end of the hydraulic cylinder assembly in a hydraulic elevator system according to the present invention.
Figure 4B:
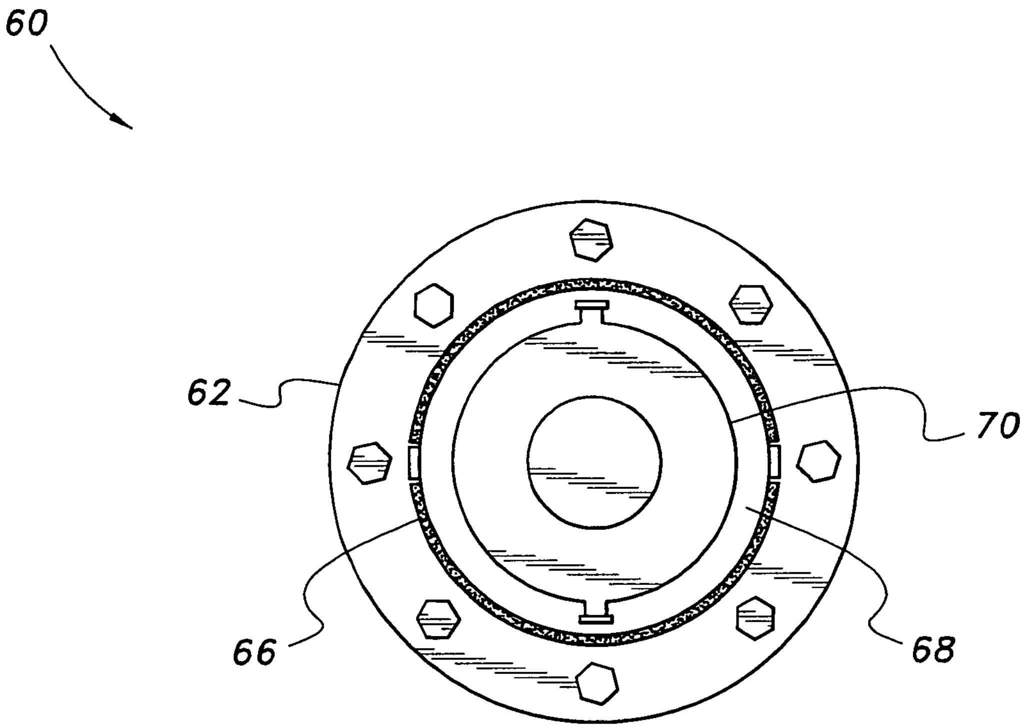
FIG. 4B is a top plan view of the gimbal assembly illustrated in FIG. 4A.

FIGS. 4A and 4B respectively provide elevation and top plan views of a gimbal assembly 60 for use with the present hydraulic elevator system. The gimbal assembly 60 comprises a gimbal support 62 installed concentrically upon the upper end of the fixed casing, e.g., casing 28 and its upper end 30 as shown in the first embodiment of FIGS. 1A and 1B. It will be seen that the assembly 60 of FIGS. 4A and 4B is equally adaptable to the second embodiment casing 128 and its upper end 130, and is shown installed thereto in FIGS. 2A and 2B. The assembly 60 may also be installed to a fixed structure installed within the elevator pit 14 of the third embodiment 210 of FIGS. 3A and 3B, with the upper end 230 of the casing 228 pivotally suspended therein.

A gimbal 66 is installed concentrically in the upper end 64 of the gimbal support 62, with the outer ring 68 of the gimbal pivotally supported by the upper end of the gimbal support and the inner ring 70 of the gimbal in turn pivotally supporting the upper end 36 of the cylinder 34. Thus, the cylinder 34 is free to pivot slightly within the limits of the well hole, to plumb itself to a perfectly vertical orientation without need for elevator mechanics to spend time consuming and tedious labor in aligning the cylinder. Even if the gimbal support 62 is not quite true to vertical, the gimbal 66 allows the cylinder 34 to hang vertically, thus assuring that the hydraulic ram 40 remains aligned with the cylinder and with its attachment to the lower crossmember 24 of the elevator sling 22. Even if some slight misalignment were to occur, the pivotal freedom provided by the gimbal 66 allows the ram 40 to articulate angularly relative to the cylinder 34 to accommodate such misalignment during operation.

Figure 5:
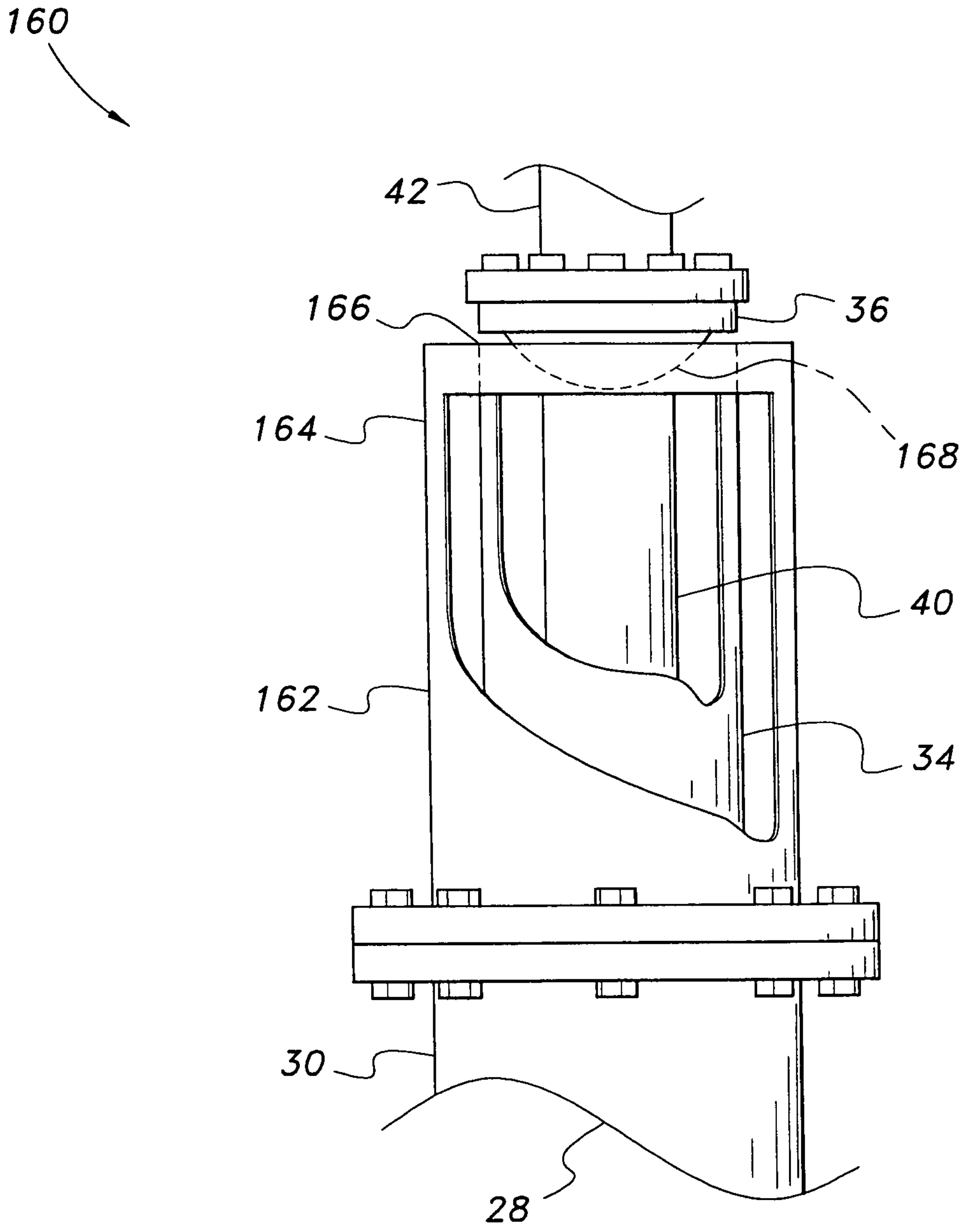
FIG. 5 is a detailed elevation view in partial section of the upper end of the hydraulic cylinder assembly similar to FIG. 4A, but incorporating a spherical joint rather than the gimbaled joint of FIG. 4A.

FIG. 5 provides an elevation view of an alternative means of allowing the ram to articulate relative to the cylinder, comprising a spherical joint assembly 160 for use with the present hydraulic elevator system. The spherical joint assembly 160 comprises a support 162 installed concentrically upon the upper end of the fixed casing, e.g., casing 28 and its upper end 30 as shown in the first embodiment of FIGS. 1A and 1B. It will be seen that the assembly 160 of FIG. 5 equally adaptable to the second embodiment casing 128 and its upper end 130, and is shown installed thereto in FIGS. 2A and 2B. The assembly 160 may also be installed to a fixed structure installed within the elevator pit 14 of the third embodiment 210 of FIGS. 3A and 3B, with the upper end 230 of the casing 228 pivotally suspended therein.

A concave spherical seat 166 is installed concentrically in the upper end 164 of the support 162, with a convex spherical fitting 168 attached to and depending from the juncture of the cylinder upper end 36 and ram upper end 42, and resting within the concave seat 166. It will be understood that FIG. 5 is somewhat schematic in nature, and that various details have been omitted in order to simplify the drawing. Conventional means is used to secure the hydraulic cylinder 34 to the ram 40 to prevent the separation of the components if the assembly is lifted from the well hole for maintenance as described further below. Thus, the cylinder 34 is free to pivot slightly within the limits of the well hole, to plumb itself to a perfectly vertical orientation without need for elevator mechanics to spend time consuming and tedious labor in aligning the cylinder. Even if the spherical joint assembly 160 is not quite true to vertical, the joint assembly 160 allows the cylinder 34 to hang vertically, thus assuring that the hydraulic ram 40 remains aligned with the cylinder and with its attachment to the lower crossmember 24 of the elevator sling 22. Even if some slight misalignment were to occur, the pivotal freedom provided by the spherical joint assembly 160 allows the ram 40 to articulate angularly relative to the cylinder 34 to accommodate such misalignment during operation.

Figure 6A:
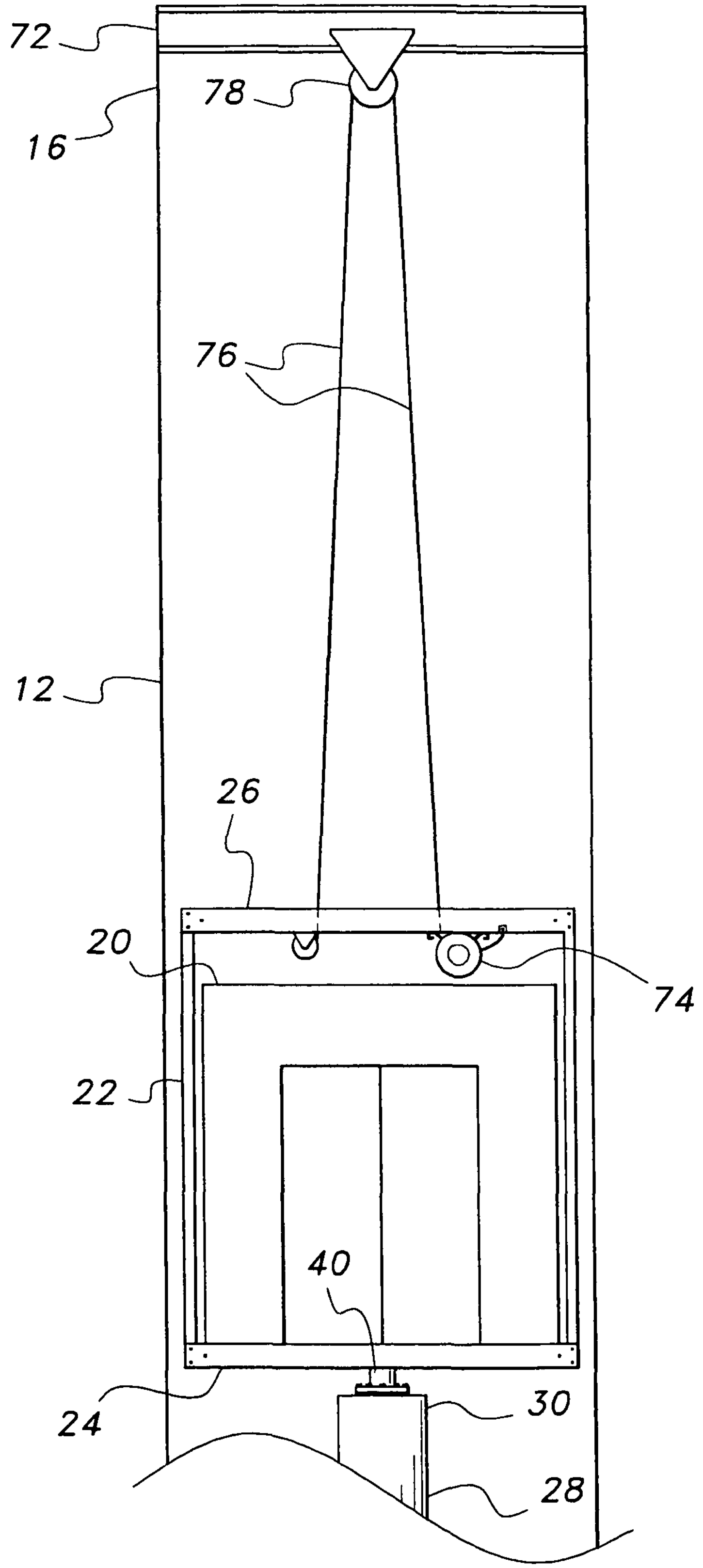
FIG. 6A is a schematic elevation view of the temporary lifting system used to perform maintenance on the hydraulic jack or cylinder and components attached to the bottom thereof in a hydraulic elevator system according to the present invention.
Figure 6B:
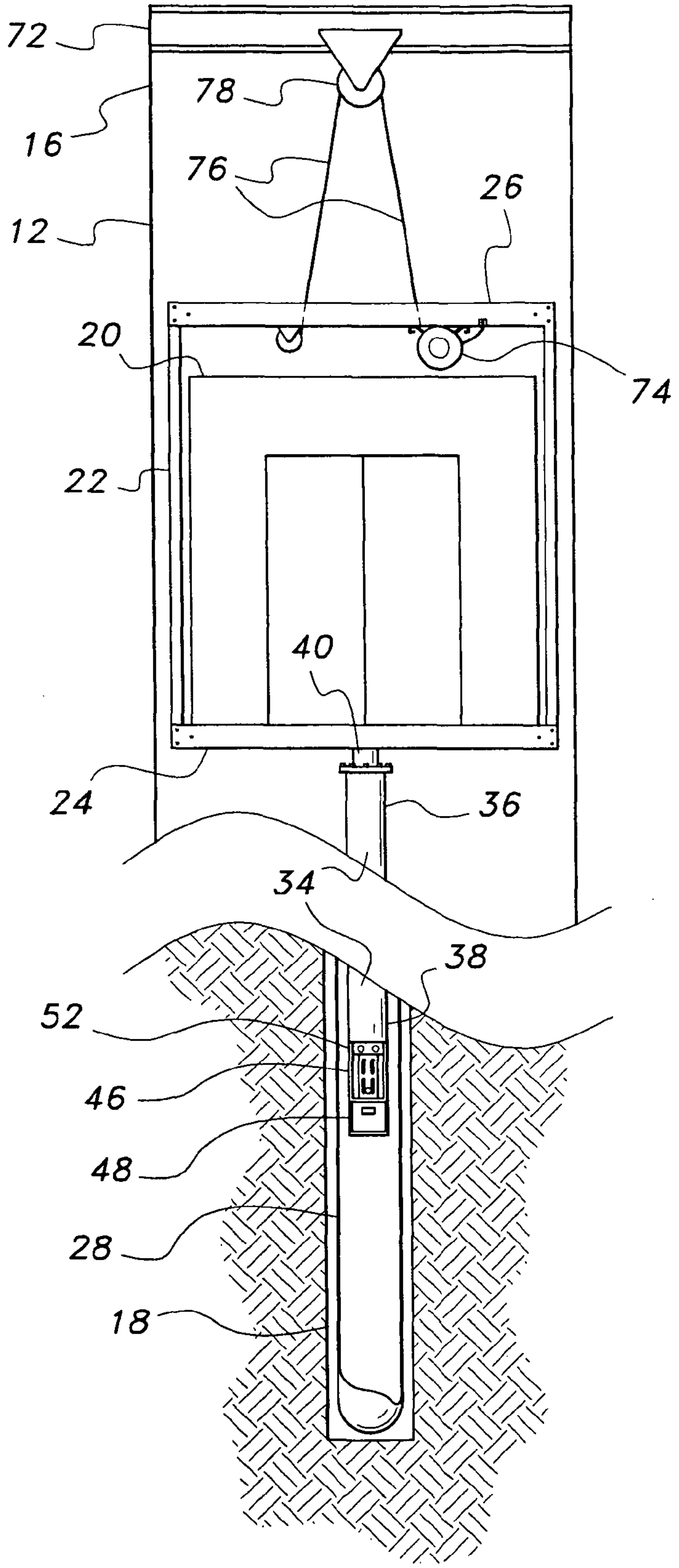
FIG. 6B is a schematic elevation view of the temporary lifting system of FIG. 6A, showing the elevator and its attached hydraulic jack assembly lifted nearly to the upper limits of their travel.

FIGS. 6A and 6B illustrate the system for removing and reinstalling the hydraulic jack assembly for maintenance, repair, and/or replacement of the assembly or any of its components. Most elevator hoistways include a hoisting beam 72 installed across the upper end 16 of the hoistway 12, as shown in FIGS. 6A and 6B. The hoisting beam is installed to provide support for temporary alternative means for lifting the elevator for maintenance. If such a hoisting beam is not installed, then the beam 72 must be installed across the top 16 of the hoistway for either conventional elevator maintenance where the elevator must be lifted by other than standard means, or for lifting the elevator using the present system.

At this point, a power winch 74 (electric, etc.) is temporarily secured to the upper crossmember or crosshead 26 of the elevator sling 22. A winch attachment bracket and power outlet may be permanently installed upon the crosshead 26 to facilitate the winch 74 installation. The winch cable 76 is extended upwardly to the hoisting beam 72, preferably through a pulley 78 secured to the beam 72 and back down to the crosshead 26 of the elevator sling 22 to provide additional mechanical advantage during the lifting operation. Alternatively, the end of the cable 76 could be attached directly to the hoisting beam, if the winch 74 provides sufficient power.

Once the winch 74 and cable 76 have been installed, the winch is actuated to lift the elevator sling 22 and its elevator car 20 slightly above its lowest position in the hoistway, i.e., sufficiently to access the upper end 30 of the casing 28 and associated components. This allows the elevator mechanic to enter the pit 14 to disconnect the upper end of the hydraulic cylinder 34 from its attachment to the upper end of the casing 28, or other attachment and connections. When the hydraulic cylinder 34 and its wiring, etc. have been disconnected, the mechanic may once again actuate the winch 74 to raise the elevator sling 22 with its elevator car 20. This also draws the hydraulic ram 40 upwardly, as it remains attached to the lower crossmember or bolster channel 24 of the sling 22. As the ram 40 is drawn upwardly, its surrounding hydraulic cylinder 34 is also drawn upwardly from its installation within the casing 28, as shown in FIG. 6B.

The compact installation of the winch 74 to the underside of the crosshead 26 of the sling 22, along with the compact attachment of the cable 76 to the hoisting beam 72, allows the sling crosshead 26 to be drawn very near to the hoisting beam 72, i.e., within a very few inches. This results in the complete withdrawal of the hydraulic cylinder 34 from the casing 28 for access to the hydraulic pump 46, pump drive motor 48, and control valve 52 for any needed maintenance, repair, or replacement. It will also be seen that this system allows the casing 28 to be removed as well if necessary. The cylinder 34 may remain attached to the casing 28, and the casing may be detached from its attachment within the bottom of the elevator pit 14, before raising the elevator sling 22, elevator car 20, and attached hydraulic components.

Figure 7:
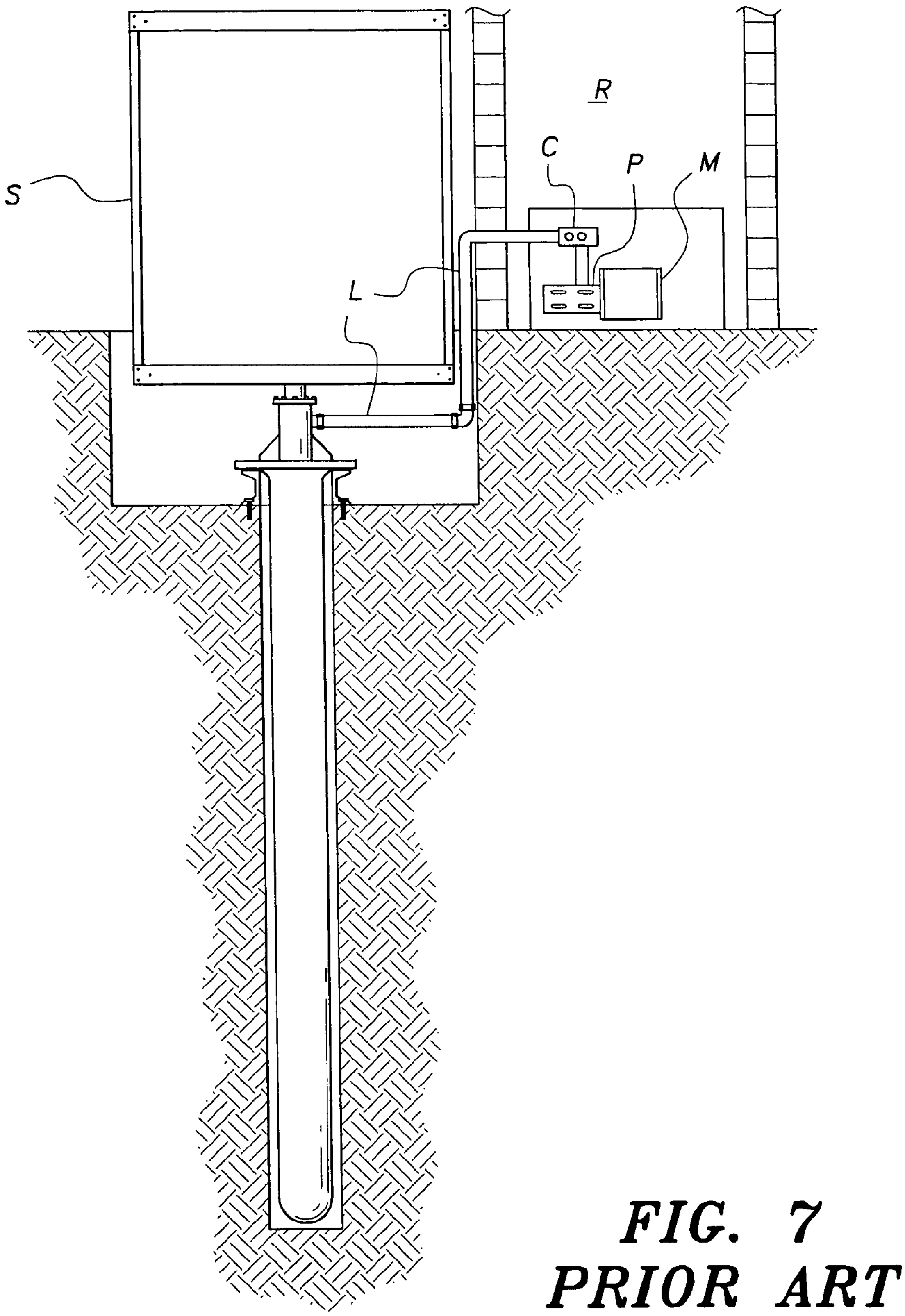
FIG. 7 PRIOR ART
FIG. 7 is a schematic elevation view of a prior art hydraulic elevator, showing its separate machine room.
Figure 8:
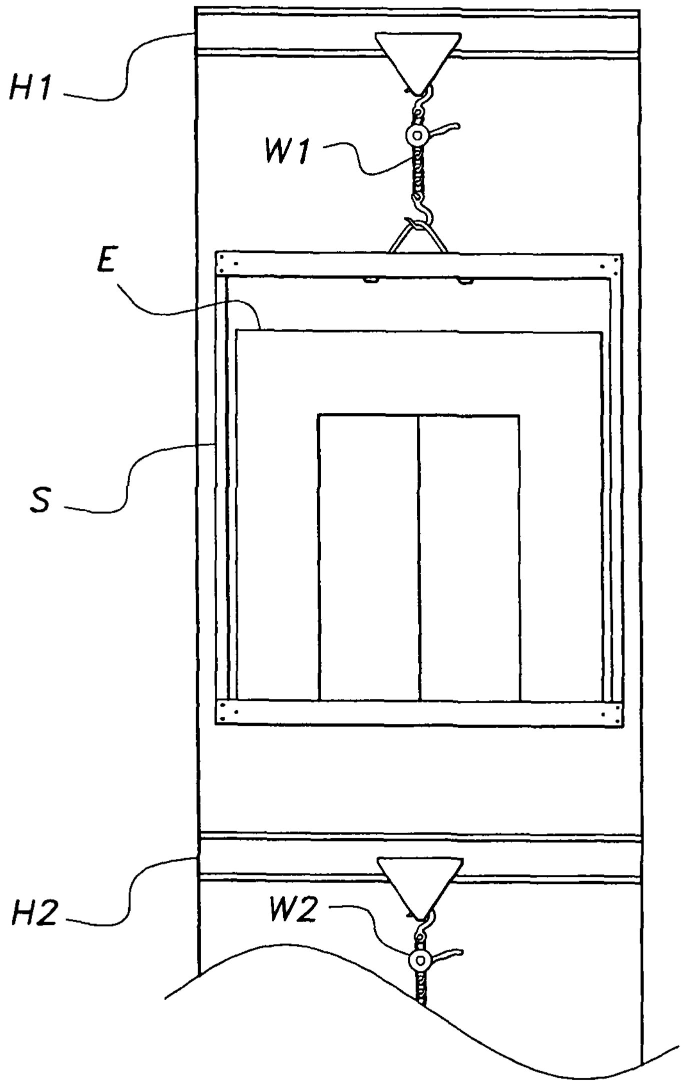
FIG. 8 PRIOR ART
FIG. 8 is a schematic elevation view of a prior art hydraulic elevator undergoing maintenance, showing the conventional means for lifting the elevator and its hydraulic ram and cylinder.

FIGS. 7 and 8 are illustrations of conventional related art elevator systems, showing their differences from the present system embodiments. Conventional hydraulic elevators place all of the power components, e.g., pump P, motor M, controller C, etc., in a machine room R separate from the elevator hoistway. Hydraulic fluid under pressure is transferred from the pump P in the machine room R to the upper end of the hydraulic cylinder beneath the elevator by a hydraulic pipe or line L. Such a system does facilitate maintenance and repair to the motor, pump, and controller, as they are easily accessible in comparison to the present system. However, such machine room installations result in additional noise, vibration, and occasional odor from hydraulic fluid and other matter located within the building structure.

Even though the power components are relatively accessible in conventional machine room hydraulic elevator installations, the hydraulic jack assembly comprising the cylinder and ram, are not. Consequently, the elevator car E and its sling S must be lifted or hoisted from the pit for access, just as in the case of the present system. Generally, conventional elevator slings S are relatively weak and are incapable of supporting the combined weights of the elevator car E and the hydraulic assembly attached therebelow. Accordingly, this requires that the hydraulic ram be detached from the bolster channel of the sling S, and the sling and its elevator car E raised to the top of the hoistway. This is conventionally accomplished by a first hand winch W1, e.g., block and tackle, etc., temporarily secured to the top hoisting beam H1 to draw the sling S and its elevator car E upwardly. At this point, since the sling S is not sufficiently strong to support the elevator car E and the hydraulic assembly, an additional second hoisting beam H2 must be temporarily installed beneath the elevator sling S. A second hand winch W or block and tackle W2 is suspended from the second hoisting beam H2, and connected to the hydraulic jack assembly to draw the hydraulic assembly upward from the well hole. This procedure can take up to a few days to accomplish, with the reinstallation requiring even more time due to the need for careful alignment and plumbing of the hydraulic jack assembly during reinstallation; this alignment and plumbing of the jack assembly can require up to a day of work alone.

In contrast, the present system enables a small crew to raise the elevator and withdraw the hydraulic jack assembly from the well hole in a very short time, e.g., on the order of an hour or so. Reinstallation requires approximately the same amount of time, i.e., on the order of an hour, due to the self-plumbing and alignment of the gimbaled hydraulic jack assembly. Accordingly, the present hydraulic elevator system solves the problems associated with hydraulic mechanisms located in separate machine rooms, and further greatly reduces the time required for maintenance and repair of the jack assembly of such hydraulic elevators.

It is to be understood that the present invention is not limited to the embodiments described above, but encompasses any and all embodiments within the scope of the following claims.

We claim:

1. A hydraulic elevator system, comprising:

an elevator hoistway having an elevator pit and a well hole extending downwardly therefrom, the elevator hoistway further having an upper end opposite the elevator pit;

an elevator car disposed within the elevator hoistway;

an elevator sling disposed about the elevator car, the elevator sling having a bolster channel and a crosshead;

a casing disposed within the well hole, the casing having an upper end and a lower end opposite the upper end;

a hydraulic cylinder disposed concentrically within the casing, the hydraulic cylinder having an upper end and a lower end opposite the upper end;

a hydraulic ram extensibly disposed concentrically within the hydraulic cylinder, the hydraulic ram having an upper end affixed to the bolster channel of the elevator sling and a lower end opposite the upper end;

a hydraulic pump and electric motor assembly installed beneath the lower end of the hydraulic ram; and a gimbal assembly including a gimbal support having an upper end, a gimbal, and an outer ring, the gimbal support being installed between the upper end of the hydraulic cylinder and the gimbal support, the hydraulic ram being attached to the bolster channel, and the hydraulic cylinder being pivotally disposed within the casing by the gimbal assembly.

2. The hydraulic elevator system according to claim 1, further comprising:

a hoisting beam disposed across the upper end of the elevator hoistway; and a power winch disposed upon the crosshead of the elevator sling, and connected to the hoisting beam;

wherein actuation of the power winch lifts the at least the elevator sling, elevator car, hydraulic cylinder, hydraulic ram, and hydraulic pump and electric motor assembly, drawing at least the hydraulic cylinder, hydraulic ram, and hydraulic pump and electric motor assembly from the well hole for maintenance and repair of the hydraulic pump and electric motor assembly.

3. A method of raising the hydraulic motor and pump assembly using the apparatus of claim 2, comprising the steps of:

(a) installing a power winch upon the crosshead of the elevator sling;

(b) extending a cable from the power winch to at least the hoisting beam;

(c) actuating the winch, thereby lifting at least the elevator sling and elevator car and accessing the elevator pit and the upper end of the hydraulic cylinder;

(d) detaching the upper end of the hydraulic cylinder within the elevator pit; and (e) further actuating the winch, thereby lifting the elevator sling and elevator car and further lifting at least the hydraulic cylinder, hydraulic ram, and hydraulic pump and electric motor assembly from the well hole.

4. The hydraulic elevator system according to claim 1, wherein:

the casing and the hydraulic cylinder define a hydraulic fluid reservoir therebetween; and the hydraulic pump and electric motor assembly is submerged within the hydraulic fluid reservoir.

5. The hydraulic elevator system according to claim 1, wherein:

the casing and the hydraulic cylinder define a hydraulic fluid reservoir therebetween; and the hydraulic pump and electric motor assembly is attached to the lower end of the hydraulic cylinder, beneath and external to the hydraulic fluid reservoir.

6. The hydraulic elevator system according to claim 1, wherein the hydraulic pump and electric motor assembly is affixed to the lower end of the hydraulic ram, the system further comprising a seal disposed at the hydraulic pump and electric motor assembly, the casing and hydraulic ram defining a hydraulic fluid reservoir above the seal, the casing and seal defining a working chamber below the seal;

wherein the hydraulic pump and electric motor assembly pump hydraulic fluid from the reservoir into the working chamber during upward elevator operation, thereby driving the hydraulic ram and the hydraulic pump and electric motor assembly upward within the casing.

7. A hydraulic elevator system, comprising:

an elevator hoistway having an elevator pit and a well hole extending downwardly therefrom, the elevator hoistway further having an upper end opposite the elevator pit;

a hoisting beam disposed across the upper end of the elevator hoistway;

an elevator car disposed within the elevator hoistway;

an elevator sling disposed about the elevator car, the elevator sling having a bolster channel and a crosshead;

a power winch disposed upon the crosshead of the elevator sling, the winch being connected to the hoisting beam;

a casing disposed within the well hole, the casing having a lower end and an upper end opposite the lower end;

a hydraulic cylinder disposed concentrically within the casing, the hydraulic cylinder having an upper end and a lower end opposite the upper end; and a hydraulic ram extensibly disposed concentrically within the hydraulic cylinder, the hydraulic ram having an upper end affixed to the bolster channel of the elevator sling and a lower end opposite the upper end; wherein actuation of the power winch lifts the elevator sling, the elevator car, the hydraulic cylinder, and the hydraulic ram, drawing at least the hydraulic cylinder and hydraulic ram from the well hole for maintenance and repair of the hydraulic cylinder and hydraulic ram;

a gimbal assembly including a gimbal support having an upper end, a gimbal, and an outer ring, the gimbal support being installed between the upper end of the hydraulic cylinder and the gimbal support, the hydraulic ram being attached to the bolster channel, and the hydraulic cylinder being pivotally disposed within the outer casing by the gimbal assembly; and a hydraulic pump and electric motor assembly installed beneath the lower end of the hydraulic ram.

8. A method of raising the hydraulic motor and pump assembly using the apparatus of claim 7, comprising the steps of:

(a) installing a hydraulic pump and electric motor assembly beneath the lower end of the hydraulic ram;

(b) installing a power winch upon the crosshead of the elevator sling;

(c) extending a cable from the power winch to at least the hoisting beam;

(d) actuating the winch, thereby lifting at least the elevator sling and elevator car and accessing the elevator pit and the upper end of the hydraulic cylinder;

(e) detaching the upper end of the hydraulic cylinder within the elevator pit; and (f) further actuating the winch, thereby lifting the elevator sling and elevator car and further lifting at least the hydraulic cylinder, hydraulic ram, and hydraulic pump and electric motor assembly from the well hole.

9. The hydraulic elevator system according to claim 7, further comprising:

a hydraulic cylinder disposed concentrically within the casing, the hydraulic cylinder having an upper end and a lower end opposite the upper end;

a hydraulic ram extensibly disposed concentrically within the hydraulic cylinder, the hydraulic ram having an upper end affixed to the bolster channel of the elevator sling and a lower end opposite the upper end; and a hydraulic pump and electric motor assembly installed beneath the lower end of the hydraulic ram.

10. The hydraulic elevator system according to claim 7, wherein:

the casing and the hydraulic cylinder define a hydraulic fluid reservoir therebetween; and the hydraulic pump and electric motor assembly is submerged within the hydraulic fluid reservoir.

11. The hydraulic elevator system according to claim 7, wherein:

the casing and the hydraulic cylinder define a hydraulic fluid reservoir therebetween; and the hydraulic pump and electric motor assembly is attached to the lower end of the hydraulic cylinder, beneath and external to the hydraulic fluid reservoir.

12. A hydraulic elevator system, comprising:

an elevator hoistway adapted to support an elevator car, the elevator hoistway having an elevator pit and a well hole extending downwardly therefrom, the elevator hoistway further having an upper end opposite the elevator pit;

a casing disposed within the well hole, the casing having a closed lower end and an open upper end opposite the lower end, wherein the upper end secures the casing within the well bore;

a hydraulic cylinder disposed concentrically within the casing, the hydraulic cylinder having an upper end and a lower end opposite the upper end, wherein the lower end is freely suspended within the casing;

a hydraulic ram extensibly disposed concentrically within the hydraulic cylinder, the hydraulic ram having an upper end adapted to be attached to an elevator car and a lower end opposite the upper end, wherein the lower end is disposed within the hydraulic cylinder;

a hydraulic pump and electric motor assembly installed beneath the lower end of the hydraulic ram, the hydraulic pump and electric motor being accessible only through the open upper end of the casing;

the casing and the hydraulic cylinder define a hydraulic fluid reservoir therebetween;

wherein said hydraulic fluid reservoir is a sole hydraulic fluid reservoir of the system; and the hydraulic pump and electric motor assembly is submerged within the hydraulic fluid reservoir and defines a sole hydraulic pump and electric motor assembly of the system.

13. The hydraulic elevator system according to claim 12, wherein the upper end of the casing is secured to the elevator pit.

14. The hydraulic elevator system according to claim 12, wherein the upper end of the hydraulic cylinder is supported by the upper end of the casing.

* * * * *